United States Patent
Weinbrenner

(10) Patent No.: US 10,399,028 B2
(45) Date of Patent: Sep. 3, 2019

(54) FILTER CLOGGING MONITORING SYSTEMS AND METHODS

(71) Applicant: TYCO FIRE PRODUCTS LP, Lansdale, PA (US)

(72) Inventor: Eric S. Weinbrenner, Suamico, WI (US)

(73) Assignee: Tyco Fire Products LP, Lansdale, PA (US)

( * ) Notice: Subject to any disclaimer, the term of this patent is extended or adjusted under 35 U.S.C. 154(b) by 0 days.

(21) Appl. No.: 15/751,355

(22) PCT Filed: Aug. 15, 2016

(86) PCT No.: PCT/US2016/047005
§ 371 (c)(1),
(2) Date: Feb. 8, 2018

(87) PCT Pub. No.: WO2017/031044
PCT Pub. Date: Feb. 23, 2017

(65) Prior Publication Data
US 2018/0229173 A1    Aug. 16, 2018

Related U.S. Application Data

(60) Provisional application No. 62/205,249, filed on Aug. 14, 2015.

(51) Int. Cl.
*G08B 21/18* (2006.01)
*B01D 46/00* (2006.01)
*B01D 46/44* (2006.01)
*F24C 15/20* (2006.01)
*F24F 11/39* (2018.01)

(52) U.S. Cl.
CPC ....... *B01D 46/0086* (2013.01); *B01D 46/446* (2013.01); *B01D 46/448* (2013.01); *F24C 15/2021* (2013.01); *F24F 11/39* (2018.01)

(58) Field of Classification Search
CPC ........ B01D 46/0086; G08B 21/18; A47L 9/19
See application file for complete search history.

(56) References Cited

U.S. PATENT DOCUMENTS

| | | | |
|---|---|---|---|
| 5,738,706 A | 4/1998 | Swanander et al. | |
| 6,170,480 B1 * | 1/2001 | Melink | F24C 15/2021 126/299 D |

(Continued)

FOREIGN PATENT DOCUMENTS

| | | |
|---|---|---|
| WO | WO 2005/059669 | 6/2005 |
| WO | WO 2005/084456 | 9/2005 |

(Continued)

*Primary Examiner* — Munear T Akki
(74) *Attorney, Agent, or Firm* — Foley & Lardner LLP

(57) ABSTRACT

Systems and methods for monitoring clogging in a cooking hood (120) are disclosed. The systems and methods can include measuring temperature in the non-exhaust side of a filter (110) and measuring pressure in an exhaust side of the filter (110) using temperature and pressure sensors (140, 160). The systems and methods can further include comparing the measured temperatures and pressures to baseline temperature and pressure values to determine if clogging occurs using the controller (170), which is communicatively coupled with the temperature and pressure sensors (140, 160).

14 Claims, 5 Drawing Sheets

(56) References Cited

U.S. PATENT DOCUMENTS

| | | | | |
|---|---|---|---|---|
| 7,963,282 B2* | 6/2011 | Griffin | .................. | A62C 3/006 |
| | | | | 126/16 |
| 8,378,834 B1* | 2/2013 | Glaub | .................... | B01D 47/06 |
| | | | | 169/56 |
| 9,460,604 B1* | 10/2016 | Daniel | .................. | G08B 21/18 |
| 2006/0100796 A1* | 5/2006 | Fraden | ...................... | A47L 9/19 |
| | | | | 702/45 |
| 2008/0053426 A1 | 3/2008 | Erdmann | | |
| 2009/0272372 A1* | 11/2009 | Griffin | ................ | F24C 15/2057 |
| | | | | 126/299 E |
| 2015/0211749 A1* | 7/2015 | Robison | .............. | F24C 15/2021 |
| | | | | 454/340 |
| 2015/0254958 A1* | 9/2015 | Sherman | ................ | G08B 21/18 |
| | | | | 340/607 |
| 2015/0330857 A1* | 11/2015 | Henderson | .............. | G01L 13/00 |
| | | | | 702/35 |
| 2016/0161324 A1* | 6/2016 | Tse | ......................... | G01G 19/58 |
| | | | | 73/862.541 |

FOREIGN PATENT DOCUMENTS

| WO | WO 2010/065793 | 6/2010 |
|---|---|---|
| WO | WO 2014/018168 | 1/2014 |

\* cited by examiner

FILTER CLOGGING MONITORING SYSTEMS AND METHODS

PRIORITY

The present application is a 371 of International App. No. PCT/US16/47005 filed Aug. 15, 2016, which claims the benefit of priority to U.S. Provisional App. No. 62/205,249 filed Aug. 14, 2015. The entire contents of the above-identified applications are hereby incorporated by reference.

TECHNICAL FIELD

This invention relates to monitoring filters, and more particularly to systems and devices for monitoring clogging within cooking hood exhaust filters.

BACKGROUND

Kitchen exhaust hoods are typically provided over cooking areas to help remove airborne grease, combustion products, fumes, smoke, odors, heat, and steam from the area above the cooking area. A fan in the exhaust hood draws the air away from the cooking area and into the exhaust hood. The air is then drawn through a filter within the hood to remove airborne grease and particulate from the air. Finally, the air can be released to an outside atmosphere.

After prolonged use, the filter of the exhaust hood tends to begin to clog with the material being filtered out of the air drawn into the hood. As the filter continues to clog, the ability of the hood to draw air away from the cooking area and into the hood is diminished. Additionally, the risk of fire increases as the filter becomes progressively more clogged. As a result, the filter needs to be periodically removed from the exhaust hood and either cleaned or replaced.

Unfortunately, it can often be difficult to determine when a filter is clogged. Visual inspection for dogging is difficult because the filter is usually located within the hood and is difficult to view without, for example, removing pieces of the exhaust hood. Similarly, detecting filter clogging by visually monitoring the air above the cooking area can be unreliable and inconclusive.

Accordingly, it would be beneficial to provide a way to monitor filter clogging that does not require direct visual inspection. It would also be beneficial to provide a way to automatically alert a user to filter clogging.

SUMMARY

Described herein are systems and methods for automatically monitoring the clogging of exhaust filters, such as exhaust filters used in cooking hoods. The systems and methods described herein allow for monitoring of exhaust filters without requiring direct visual inspection of the exhaust filter. The systems and methods described herein also provide for automatic alerts to be transmitted when clogging of the filter begins to occur. The systems and methods described herein also provide for establishing custom baseline temperature and pressure measurements used to detect filter clogging are also customizable monitoring In some embodiments, the system for monitoring filter clogging described herein includes one or more temperature sensors for measuring residual heat positioned on the non-exhaust side of a filter installed in a cooking hood and one or more pressure sensors positioned on the exhaust-side of the filter. The temperature and pressure sensors take measurements and send data to a controller, which collects and processes the data. In some embodiments, the controller can compare the measured temperature and pressure data to baseline temperature and pressure values. In the case where the measured temperature and pressure are sufficiently different from the baseline temperature and pressure values, the controller can send a warning message indicating some level of filter clogging. The system generally works on the principle that the temperature will increase (via residual heat build-up) on the non-exhaust side of the filter and pressure will decrease on the exhaust side of the filter when the filter begins to clog due to reduced air flow through the filter.

In some embodiments, a method of monitoring clogging of a filter includes measuring the temperature in the non-exhaust side of the filter and measuring the pressure in the exhaust side of the filter; comparing the measured temperature and pressure to a baseline temperature and pressure, and transmitting a warning signal when the temperature exceeds the baseline temperature and/or when the pressure falls below the baseline pressure. In some embodiments, the method further includes establishing the baseline temperature and pressure by recording temperature and pressure data for a period of time following the installation of a new or dean filter, and averaging these measurements to thereby set a baseline temperature and baseline pressure when the filter is unclogged.

DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the exemplary embodiments of the invention. It should be understood that the preferred embodiments are some examples of the invention as provided in the appended claims.

Like reference symbols in the various drawings indicate like elements unless otherwise indicated.

DETAILED DESCRIPTION

Figure 1:
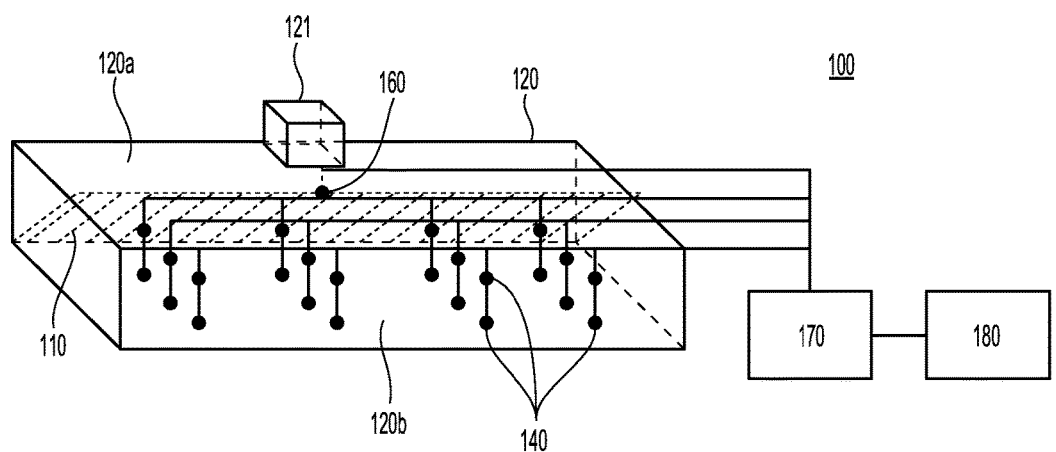
FIG. 1 is a schematic diagram of a system for monitoring filter dipping in cooking hoods according to various embodiments described herein.
Figure 2:
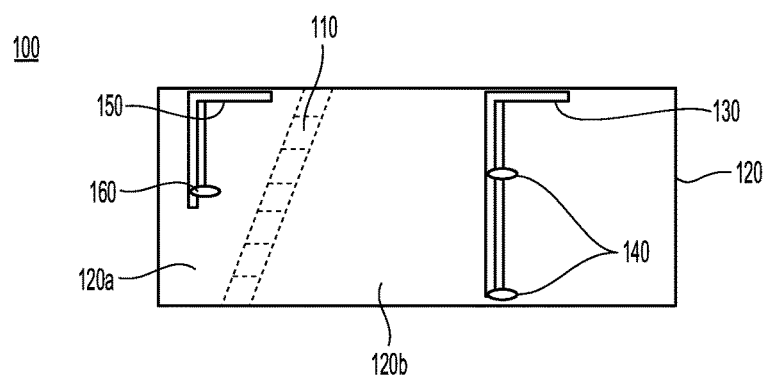
FIG. 2 is a simple cross-sectional view of a cooking hood having installed therein various components of a system for monitoring clogging of filters according to various embodiments described herein.

With reference to FIGS. 1 and 2, a system 100 for monitoring clogging of a filter 110 installed in a cooking hood 120 according to embodiments described herein includes a non-exhaust side mounting device 130, temperature sensors 140 coupled to the non-exhaust side mounting device 130, an exhaust side mounting device 150, a pressure sensor 160 coupled to the exhaust side mounting device 150, a controller 170, and a user display 180. The temperature sensors 140 and the pressure sensor 160 monitor the temperature and pressure, respectively, inside the cooking hood 120 and transmit measurements to the controller 170. The controller 170 processes the measurements and transmits warning signals to the user display 160 when certain conditions are met.

The filter 110 and the cooking hood 120 used in the system 100 are generally not limited to any specific type of filter or cooking hood. The filter 110 can be any filter suitable for use in a cooking hood. The cooking hood 120 can be type of cooking hood, including cooking hoods typically used in personal residences or cooking hoods used in commercial restaurants. The size of the cooking hood 120 is not limited and will generally depend on the specific application in which it is used. The filter 110 will generally be a filter compatible with the cooking hood 120 in which it is installed.

As shown in FIGS. 1 and 2, the cooking hood 120 has a generally rectangular, shape, though any shape can be used. The cooking hood 120 can have a partially open bottom face up through which air in the cooking area passes. The open portion of the bottom face of the cooking hood 120 is in fluid communication with the non-exhaust side of the cooking hood such that air pulled up into the cooking hood 120 only enters the cooking hood 120 on the non-exhaust side of the filter 110. The remaining sides of the cooking hood 120 are generally closed and do not permit the passage of air therethrough.

As shown in FIGS. 1 and 2, the filter 110 has a generally rectangular shape, and is sized so that the filter 110 separates the cooking hood 120 into an exhaust side 120A and a non-exhaust side 120B. The fifer 110 needs to separate the cooking hood 120 into these two areas so that no air entering the cooking hood from the non-exhaust side 120B and travel to the exhaust side 120A without passing through the filter 110. The filter 110 is oriented in a diagonal manner within the cooking hood 120, though other orientations are permitted provided the filter 110 separates the exhaust side 120A from the non-exhaust side 120B of the cooking hood 120. While the filter 110 shown in FIGS. 1 and 2 has a rectangular shape, any other shape can be used (provided again that the shape separates the exhaust side 120A from the non-exhaust side 120B.

The cooking hood 120 also includes an exhaust fan 121. The exhaust fan can provide the suction that polis air from the cooking area up into the non-exhaust side 120B of the cooking hood 120 and through the filter 110 to the exhaust side 120A. Air passes into the exhaust side 120A and than travels out of the cooking hood 120 via the exhaust fan 121 and out to an external atmosphere.

The system 100 further includes non-exhaust side mounting device 130 and exhaust side mounting device 150. The mounting devices 130, 150 are generally used to position the temperature sensors 140 and pressure sensors 160 at various locations within the cooking hood 120, including positions away from the walls of the cooking hood 120 (i.e., in the interior space of the cooking hood 120). Any mounting device suitable for use within a cooking hood 120 and which can be mounted to the cooking hood 120 can be used. The material of the mounting device is generally any material capable of withstanding the conditions within a cooking hood (e.g., elevated temperatures).

With reference to FIGS. 1 and 2, the mounting devices 130, 150 can include a plurality of identical L-shaped brackets. One leg of each L bracket can be aligned parallel with the roof of the cooking hood 120 and coupled to the cooking hood 120. Any manner of securing the L brackets to the cooking hood can be used. The other leg of each L bracket is oriented perpendicular to the roof of the cooking hood and extends down into the interior space of the cooking hood 120. A plurality of L brackets can be used and positioned throughout the cooking hood 120, including in orderly rows. In other embodiments, L-shaped brackets can be secured to the side walls of the cooking hood so that one leg of the bracket extends horizontally into the interior space of the cooking hood 120. Still other configurations for the mounting devices 130, 150 can also be used.

In some embodiments, the mounting devices 130, 150 are adjustable so that they can be aligned in several different configurations. For example, the length of the segment extending into an interior space of the cooking hood can be increased or decreased. This can allow for the placement of temperature sensors and pressure sensors in different locations throughout the cooking hood, and can also make a single mounting device adaptable for use in cooking hoods of various sizes.

One or more temperature sensors 140 are coupled to non-exhaust side mounting device 130. In some embodiments, one or more temperature sensors 140 are coupled to each segment of the mounting device 130 that extends into the interior space of the non-exhaust side 120B. As shown in FIGS. 1 and 2, each segment of the mounting device 130 that extends into the interior space of the non-exhaust side 120B includes two temperature sensors 140, though in application, any number of temperature sensors can he provided on each segment. As also shown in FIGS. 1 and 2, the temperature sensors 140 on each segment are all equally spaced apart from one another so as to form an evenly dispersed grid of temperature sensors throughout the interior space of the non-exhaust side 120B. This configuration can allow for taking multiple temperature readings throughout the non-exhaust side 120A of the cooking hood 120.

The temperature sensors 140 can be any type of temperature sensor suitable for use in the cooking hood environment, which are capable of measuring residual heat, and which are capable of transmitting measurements to, for example, a controller. Exemplary temperature sensors suitable for use in the system 100 include, but are not limited to, thermistors, thermocouples, and resistance temperature detector.

One or more pressure sensors 160 are coupled to exhaust side mounting device 150. In some embodiments, a single pressure sensor 160 coupled to a single mounting device 150 is provided in the exhaust side 120A. As shown in FIGS. 1 and 2, the single pressure sensor 160 can be located proximate the exhaust fan 121, though other locations on the exhaust side 120A can be used. In other embodiments, multiple pressure sensors 160 coupled to multiple mounting devices 150 are provided throughout the exhaust side 120A to obtain multiple pressure measurements.

The pressure sensors 160 can be any type of pressure sensor suitable for use in the cooking hood environment and which are capable of transmitting measurements to, for example, a controller. In some embodiments, the pressure sensor is a pressure transducer.

he temperature sensors 140 and pressure sensor 160 are communicatively coupled to a controller 170 so that temperature and pressure measurements taken within the cooking hood 120 can be transmitted to the controller 170. Any suitable manner of transmitting data from the temperature sensors 140 and pressure sensors 160 to the controller 170 can be used. FIGS. 1 and 2 depict a wired communication between the temperature sensors 140, the pressure sensors 160 and the controller, but wireless and other communications can be used.

The controller 170 can be any controller suitable for receiving and processing measurements taken by the temperature sensors 140 and pressure sensors 160. The controller 170 should also be capable of transmitting signals, such as warning signals, after processing the received data. Exemplary controllers suitable for use in the system 100 include, but are not limited to programmable logic controllers.

Figure 3A:
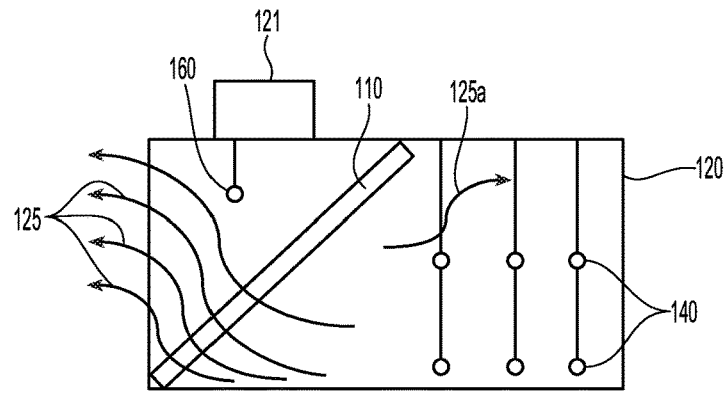
FIG. 3A-3C are simple cross-sectional views of a cooking hood having installed therein various components of a system for monitoring clogging of filters according to various embodiments described herein.
Figure 3B:
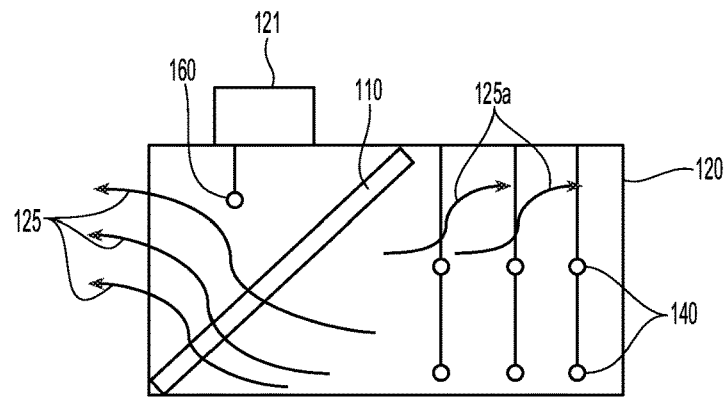
Figure 3C:
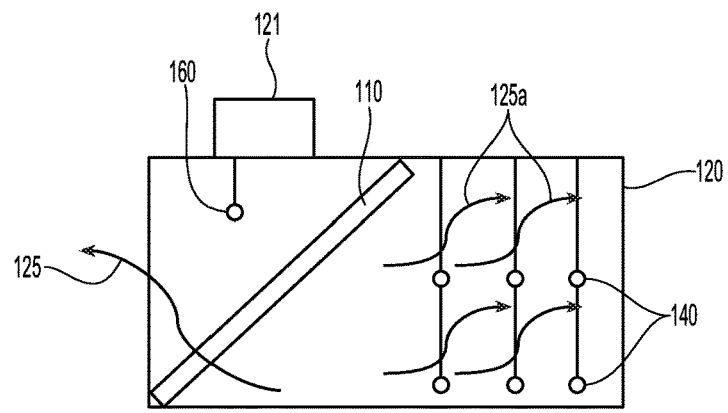

With reference to FIGS. 3A-3C, the filter clogging monitoring system 100 operates on the principle that as the filter 110 clogs, residual heat builds up on the non-exhaust side of the hood such that temperature recorded by the temperature sensors 140 increases and the pressure recorded by the pressure sensor 160 decreases due to decreased air flow through the filter 110. In FIG. 3A, a clean filter 110 allows most air 125 sucked into the cooking hood 120 via exhaust fan 121 to pass through the filter, providing for normal pressure readings taken by the pressure sensor 150 on the exhaust side 120A. A small amount of air 125A remains in the non-exhaust side 120B at least temporarily, and temperature readings of the residual heat of this air are taken by temperature sensors 140. In FIG. 3B, the filter begins to clog, and as a result, less air 125 passes through the filter 110, causing the pressure readings on the exhaust side 120A to drop. The built-up residual heat of the air 125A on the non-exhaust side 120B causes the temperature to increase on the non-exhaust side 120B. Finally, in FIG. 3C, the filter 110 is almost completely clogged, with very little air 125 passing through the filter 110. This results in a further drop in pressure on the exhaust side 120A. The residual heat of the air 125A not passing through the filter builds-up on the exhaust side 120B and further raises the temperature.

In view of the above discussion, the system 100 disclosed herein operates by first establishing a baseline temperature and baseline pressure when the filter is new/clean. The baseline temperature and baseline pressure set a value around which the subsequently measured temperatures and pressures recorded in the cooking hood 120 during use should remain provided the filter remains unclogged. When the temperature recordings begin to go up relative to the baseline temperature (due to warm air build up on the non-exhaust side 120B as shown in FIG. 3A), this indicates filter cloying. Similarly, when the pressure recordings begin to go down relative to the baseline pressure (due to decreased air flow through the filter as shown in FIG. 3A), this indicates filter dogging. Accordingly, the controller performs a comparison function wherein the measured temperature and pressure are compared to the baseline temperature and pressure.

Figure 4:
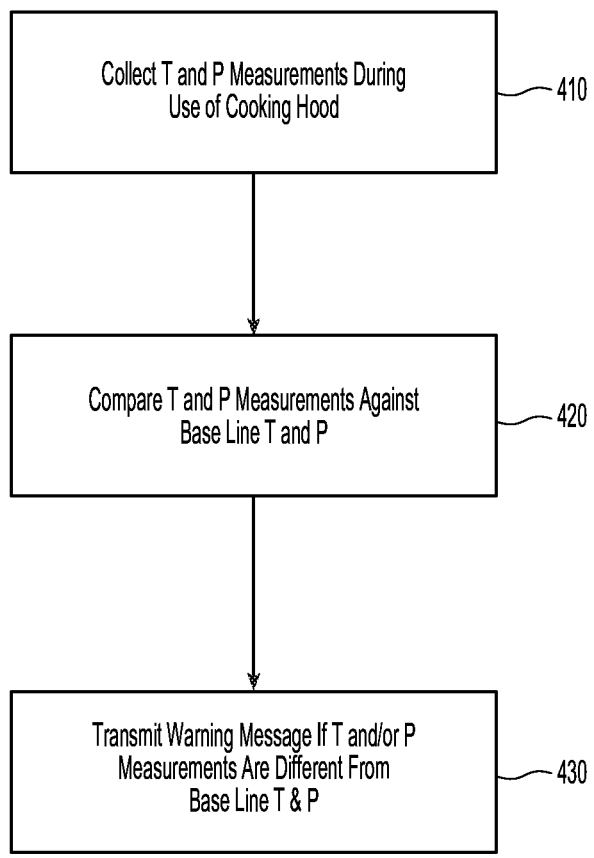
FIG. 4 is a flow chart illustrating a method of monitoring filter clogging according to various embodiments described herein.

Thus, a primary function of the controller 170 is to receive temperature and/or pressure measurements from temperature sensors 140 and pressure sensors 160 and compare these measurements against a baseline temperature value and/or a baseline pressure value. With reference to FIG. 4, a method 400 of monitoring filter dogging that can be carried out by the controller is illustrated. In step 410, temperature and pressure measurements are collected periodically during use of the cooking hood. The temperature and pressure measurements are taken by the temperature sensors and the pressure sensors, which transmit the measurements to the controller. In some embodiments, the controller collects these measurements and averages them into a single number (such as to reflect multiple temperature and pressure measurements taken over a period of time and/or to reflect multiple temperature and/or pressure measurements taken at different locations at a single point in time. In step 420, the measured (and potentially averaged) temperature and pressure measurements are compared against baseline temperature and pressure. The controller makes this comparison and determines if the measured temperatures and pressures are different or sufficiently different) from the baseline temperature and pressure. In step 430, a clogging warning message is transmitted if the comparison from step 420 reveals that the measured temperature and/or pressure is different (or sufficiently different) from the baseline temperature and pressure.

In some embodiments. the baseline temperature value and baseline pressure value are preprogrammed into the controller based on, for example, a manufacturers analysis of what baseline temperature and pressure should be for a given model of cooking hood. In some embodiments, the user sets the baseline temperature and pressure using a user interface that communicates with the controller. In still other embodiments, the baseline temperature and pressure are established by using a learn mode programmed into the controller. The learn mode generally involves the system 100 running similarly to as described above, but all of the recorded pressures and temperatures are recorded and averaged over a period of time after a new or clean filter has been installed. In essence, the learn mode takes temperature and pressure recordings during a time when it is known that the filter is operating optimally to thereby establish what the temperature and pressure readings should always be, assuming an unclogged filter. The system can include a user interface that allows the user to begin a learn mode, which is typically only engaged immediately after a new or clean filter has been installed. The learn mode can be set up so that various parameters of the learn mode can be set by the user. For example, the learn mode should be carried out for a set period of time after the installation of the new filter. This value can be pre-set, or a user can input the time period during which temperature and pressure recordings should be used to calculate baseline temperature and pressure. Further discussion of this user interface and learn mode customization is set forth below.

Figure 5:
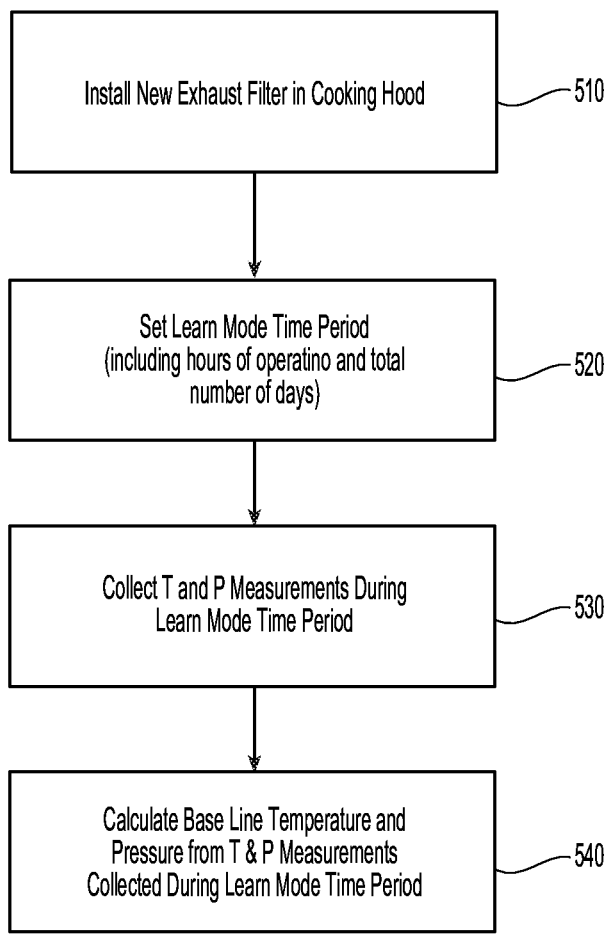
FIG. 5 is a flow chart illustrating a method of carrying out a filter clogging system learn mode according to various embodiments described herein.

With reference to FIG. 5, a method 500 of carrying out a learn mode for establishing a baseline temperature and a baseline pressure is illustrated. In step 510, a new and/or clean filter is installed in the cooking hood. The learn mode is typically only carried out after a new or clean filter is installed so as to ensure that the baseline temperatures and pressures being established during the learn mode reflect the conditions when the filter is unclogged. In step 520, the user optionally sets the learn mode time period. The learn mode time period can be, for example, the range of dates when the temperatures and pressures should be recorded to establish the baseline temperature and pressure as well as the times during each day that the temperature and pressure should be recorded. Setting the time period helps to ensure that measurements are taken on a day or at a time when the cooking hood is not in use. Setting a time period also helps to ensure that temperature and pressure measurements are not taken after a filter likely begins to clog. In some embodiments, step 520 can be eliminated, such as when the controller includes a preprogrammed learn mode time period. In step 530, temperature and pressure measurements are recorded during the learn mode time period. The temperature and pressure measurements are collected by the various temperature and pressure sensors included within the cooking hood and transmitted to the controller for processing. In step 540, all of the data collected during the learn mode time period is used to calculate the baseline temperature and baseline pressure. The calculation can be a basic averaging of ail of the measurements taken. In some embodiments, the controller is programmed to eliminate any outlier measurements which may skew the baseline temperature and pressure measurements. Once established by the learn mode, the baseline temperature and baseline pressure can be used in the methods described above as a comparison for determining if temperatures are rising and pressures are dropping to thereby denote filter clogging.

In some embodiments, the controller 170 can be programmed such that any temperature measurements and pressure measurements taken within the cooking hood 120 that are different from the baseline temperature and baseline pressure indicate clogging, an therefore the controller 170 transmits a warning message under these conditions. In other embodiments, the controller 100 can be programmed so that measured temperature and pressure are allowed to be a pre-set amount different from the baseline temperature and pressure before a warning signal is sent. These pre-set amounts are termed temperature tolerance value and pressure tolerance value. Any tolerance values can be used based on, for example, the tolerance of the user to some clogging. In some embodiments, the tolerance values are a set number, while in other embodiments, the tolerance values are based on the percentage values. The tolerance values can be manually established by the user, or can be preprogrammed into the controller by a manufacturer.

In some embodiments, the controller 170 can also utilize more than one temperature tolerance value and/or pressure tolerance value to thereby provide information relating to degrees of clogging. For example, a first temperature tolerance value and a second tolerance value greater than the first temperature tolerance value can be established. When the measured temperature exceeds the first baseline temperature by more than the first temperature tolerance value but less than the second temperature tolerance value, this can lead to the controller transmitting a warning message that the filter is beginning to clog. When the measured temperature exceeds the baseline temperature by both the first temperature tolerance vale and the second temperature tolerance value, the controller can be programmed to transmit a warning message that the filter is clogged. Any number of tolerance values for temperature and/or pressure can be established to provide any number of levels of warnings.

In some embodiments, the controller 170 is programmed to transmit warning messages when either the measured pressure or the measured temperature differs from the baseline pressure and the baseline temperature by more than the pressure tolerance value and the temperature tolerance value In other embodiments, the controller 170 is programmed to transmit a warning message only when both conditions are met.

As shown in FIG. 1 the controller 170 is typically located outside and/or away from the cooking hood environment. The controller 170 location/distance away from the cooking hood is generally not limited, provided that the measurements taken by the temperature sensors 140 and pressure sensors 160 can be transmitted to the controller 170.

The system 100 further includes a user display 180. The user display 180 is any suitable user display that can communicate with the controller 170 (receive and transmit data/signals) and which provides a display for conveying information to a user. In some embodiments, the user display also provides a user interface allowing a user to input information, data, etc., that can subsequently be used by, e.g., the controller. The user interface can be any suitable interface, such as a touch screen. The user display/user interface can also include an interface button, such as toggle and directional buttons. In some embodiments, the user display 180 is incorporated into the controller 170 so that the two components are part of the same device. In other embodiments, the user display is part of a device that is separate from the controller 170. In some embodiments, the user display can be the display of a mobile device, such as a laptop, mobile phone, tablet computer, etc. (in which case the mobile device may run software for interfacing with the system 100).

Figure 6:
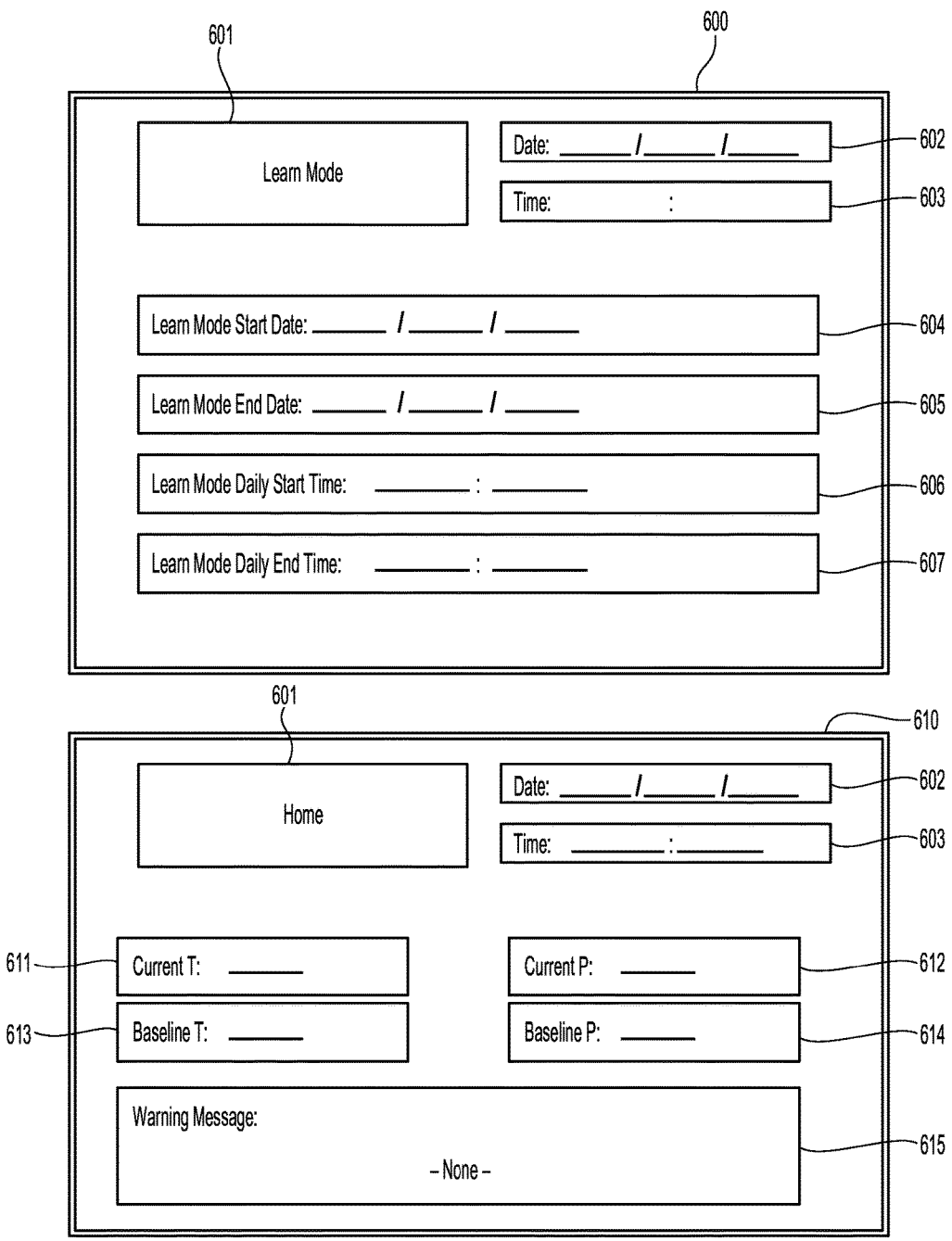
FIG. 6 is an illustration of a user interface suitable for use in system for monitoring clogging of filters according to various embodiments described herein.

With reference to FIG. 6. two illustrative screens for displaying on a user display 180 of the system 100 are shown: a Learn Mode screen 600, and a Home screen 610.

Screen 600 illustrates a "Learn Mode" screen that a user can interface with to establish the learn mode discussed in greater detail above. The Learn Mode screen 600 can include a title box 601, which indicates that the Learn Mode screen 600 is being displayed. The Learn Mode screen 600 further includes a date box 602. and a time box 603 for displaying the current date and time. The date and time can be set manually by the user or date and time information can be access via, e.g., the Internet. When the date and time are entered manually by a user, toggle button, a touch screen, or the like can be provided to allow the user to enter the necessary information.

The screen 600 further includes four boxes for inputting the time range of the learn mode: a Learn Mode Start Date box 604, a Learn Mode End Date box 605, a Learn Mode Daily Start Time box 600, and a Learn Mode Daily End Time box 607. The Learn Mode Start Date box 604 and the Learn Mode End Date 605 allow the user to establish the dates over which the Learn Mode will be carried out, with the Learn Mode Start Date typically being the day a new filter is installed, and the Learn Mode End Date typically being some date several days after the Learn Mode Start Date but before any significant filter dogging is expected. The Learn Mode Daily Start Time box 606 and the Learn Mode Daily End Time box 607 allow the user to specify the hours during the day when the cooking hood is in use. Setting the start and end time each day can be useful in situations where, for example, a conking hood is not typically used earlier in the day. In such situations, the start can be set after this early period of non-use so that temperatures and pressures are not recorded during periods of non-use.

With continuing reference to FIG. 6, a "Home" screen 610 can also be displayed on the user display 180. The user display may include buttons or other means of switching back and forth between displaying the Home screen 610 and the Learn Mode screen 600. The Home screen 610, like the Learn Mode Screen 600, includes a title box 601, a date box 602, and a time box 603.

The Home screen 610 further includes a Current Temperature box 611, a Current. Pressure box 612, a Baseline Temperature box 613, a Baseline Pressure box 614, and a Warning Message box 615. The Current Temperature box 611 and the Current Pressure box 612 provide real time readings for the temperature and pressure inside the cooking hood (as measured by the temperature sensors 140 and pressure sensors 160) In embodiments, where multiple temperature and/or pressure measurements are being taken, the Current Temperature box 611 and/or the Current Pressure box 612 can provide averages. When multiple sensors are being used, the Home screen 610 can also be adjusted to show Current Temperatures or Current Pressures in various regions of the cooking hood. For example, where the system 100 includes temperature sensors 140 as shown in FIG. 1, the Home screen 610 can display the Current Temperature in the top row of temperature sensors and the Current Temperature in the bottom row of sensors.

The Baseline Temperature box 613 and the Baseline Pressure box 614 display the baseline temperature and baseline pressure established during the learn mode. Providing the Baseline Temperature box 613 and the Baseline Pressure box 614 proximate the Current Temperature box 611 and the Current Pressure box 612 can allow for real time visual inspection and comparison of the temperature and pressure.

While not shown in FIG. 6, the Home screen 610 can further include boxes for displaying the one or more temperature tolerance value and the one or more pressure tolerance value. The Home screen can also provide the ability for the user to manually set and changes these values, such as through the use of toggle buttons or a touch screen.

The Home screen further includes a Warning Message box 615. The Warning Message Box displays warning messages and other information relating to the operation of the filter clogging monitoring system 100. In some embodiments, the Warning Message box will display text-based messages relating to the clogging of the filter. such as the filter is beginning to dog or has dogged (based on the controller's comparison of the measured T and P versus the baseline T and P, and potentially taking into account one or more tolerance values). While text based messages are discussed herein, any other type of warning signal can be provided via the Warning Message box 615. For example, the Waring Message box displays only colors instead of text, with each color denoting a state of clogging for the filter (e.g., green Warning Message box means no clogging, yellow Warning Message box means some clogging, and red Warning Message box means the filter is clogged and needs to be replaced). The user display 180 can also include a speaker so that audio messages can be transmitted in addition to or in place of the messages conveyed in the Warning Message box 615.

The description provided herein primarily discusses the use of the system and methods in conjunction with a cooking hood. However, the system described herein is generally applicable to any other system including a filter which may clog. Other applications of the system described herein include, but are not limited to, HVAC systems, car, bus, or airplane cabin filters, shower/bathroom filters, etc.

A number of embodiments of the invention have been described. Nevertheless, it will be understood that various modifications may be made without departing from the spirit and scope of the invention. Accordingly, it is intended that the present invention not be limited to the described embodiments, but that it has the full scope defined by the language Of the following claims, and equivalents thereof.

What is claimed is:

1. A system for monitoring clogging of an exhaust filter installed in a cooking hood, the system comprising:
 a temperature sensor bracket disposed in the cooking hood on a non-exhaust side of the exhaust filter, wherein at least a portion of the temperature sensor bracket extends into a non-exhaust side interior space of the cooking hood;
 at least one temperature sensor coupled with the portion of the temperature sensor bracket extending into the non-exhaust side interior space of the cooking hood;
 a pressure sensor bracket disposed in the cooking hood on an exhaust side of the exhaust filter, wherein at least a portion of the pressure sensor bracket extends into an exhaust side interior space of the cooking hood;
 at least one pressure sensor coupled with the portion of the pressure sensor bracket extending into the exhaust side interior space of the cooking hood;
 a user display; and
 a controller communicatively coupled with the at least one temperature sensor, the at least one pressure sensor, and the user display, wherein the controller:
  receives a temperature measurement from the at least one temperature sensor;
  receives a pressure measurement from the at least one pressure sensor; and
  transmits a warning signal to the user display when both of (a) the temperature measurement exceeds a base-line temperature by more than a first temperature tolerance value and (b) the pressure measurement exceeds a base-line pressure by more than a first pressure tolerance value.

2. The system of claim 1, wherein the at least one temperature sensor is selected from the group consisting of a thermistor, a thermocouple, and a resistance temperature detector.

3. The system of claim 1, wherein two or more spaced-apart temperature sensors are coupled to the portion of the temperature sensor bracket extending into the non-exhaust side interior space of the cooking hood.

4. The system of claim 1, wherein the user display includes a user interface.

5. The system of claim 4, wherein the first temperature tolerance value and the first pressure tolerance value can be input via the user interface.

6. The system of claim 1, wherein the user display is a component of a mobile device.

7. The system of claim 1, wherein the controller further carries out a learn mode to establish the base-line temperature and the base-line pressure.

8. A method of monitoring clogging in a cooking hood exhaust filter, the method comprising:
 averaging periodically measured temperatures taken at a non-exhaust side of the exhaust filter and periodically measured pressures taken at an exhaust side of the exhaust filter to establish a base-line temperature value and a base-line pressure value, respectively;
 transmitting a clogging warning signal when both of (a) a temperature measurement taken at the non-exhaust side of the exhaust filter exceeds the base-line temperature by a first temperature tolerance value and (b) a pressure measurement taken at the exhaust side of the exhaust filter exceeds the base-line temperature by a first pressure tolerance value; and
 transmitting a clogged warning signal when both of (a) a temperature measurement taken at the non-exhaust side of the exhaust filter exceeds the base-line temperature by a second temperature tolerance value and (b) a pressure measurement taken at the exhaust side of the exhaust filter exceeds the base-line temperature by a second pressure tolerance value,
 wherein the second temperature tolerance value is greater than the first temperature tolerance value and the second pressure tolerance value is greater than the first pressure tolerance value.

9. The method of claim 8, wherein the periodically measured temperatures are taken at a plurality of locations throughout the non-exhaust side of the exhaust filter.

10. The method of claim 8, wherein all temperature and pressure measurements are taken during use of the cooking hood.

11. The method of claim 8, wherein the first pressure tolerance value and first temperature tolerance value are established by a user input.

12. The method of claim 8, A method of monitoring clogging in a cooking hood exhaust filter, the method comprising:
- averaging periodically measured temperatures taken at a non-exhaust side of the exhaust filter and periodically measured pressures taken at an exhaust side of the exhaust filter to establish a base-line temperature value and a base-line pressure value, respectively; and
- transmitting a clogging warning signal when both of (a) a temperature measurement taken at the non-exhaust side of the exhaust filter exceeds the base-line temperature by a first temperature tolerance value and (b) a pressure measurement taken at the exhaust side of the exhaust filter exceeds the base-line temperature by a first pressure tolerance value,
- wherein the temperature measurement taken at the non-exhaust side of the exhaust filter is the average of two or more temperature measurements taken at different locations throughout the non-exhaust side of the exhaust filter.

13. A system for monitoring filter clogging, the system comprising:
- at least one temperature sensor located at a non-exhaust side of a filter;
- at least one pressure sensor located at an exhaust side of the filter; and
- a controller communicatively coupled with the at least one temperature sensor and the at least one pressure sensor, wherein the controller transmits a message when both of:
  (a) a temperature measurement taken by the at least one temperature sensor is higher than a temperature tolerance value; and
  (b) a pressure measurement taken by the at least one pressure sensor is higher than a pressure tolerance value, and
- wherein the temperature tolerance value and the pressure tolerance value are established by a learn mode carried out by the controller, the learn mode comprising:
averaging periodic temperature measurements taken by the at least one temperature sensor for a period of time following installation of a new filter to establish the temperature tolerance value; and
- averaging periodic pressure measurements taken by the at least one pressure sensor for the period of time following installation of a new filter to establish the pressure tolerance value.

14. The system of claim 13, wherein the message is transmitted when both of (a) and (b) are satisfied.

* * * * *